(12) United States Patent
Bocirnea

(10) Patent No.: US 8,907,966 B2
(45) Date of Patent: Dec. 9, 2014

(54) METHODS, APPARATUSES AND COMPUTER PROGRAM PRODUCTS FOR PROVIDING ADAPTIVE RENDERING QUALITY DEGRADATION

(75) Inventor: Radu Catalin Bocirnea, New Westminster (CA)

(73) Assignee: McKesson Financial Holdings, Hamilton (BM)

( * ) Notice: Subject to any disclaimer, the term of this patent is extended or adjusted under 35 U.S.C. 154(b) by 906 days.

(21) Appl. No.: 13/075,593

(22) Filed: Mar. 30, 2011

(65) Prior Publication Data
US 2012/0249567 A1    Oct. 4, 2012

(51) Int. Cl.
*G09G 5/00*    (2006.01)
*G06F 3/14*    (2006.01)
*G09G 5/34*    (2006.01)

(52) U.S. Cl.
CPC .............. *G06F 3/14* (2013.01); *G09G 2370/02* (2013.01); *G09G 2340/02* (2013.01); *G09G 2370/16* (2013.01); *G09G 5/346* (2013.01); *G09G 2380/08* (2013.01); *G09G 2350/00* (2013.01)
USPC ............ 345/581; 345/611; 345/619; 345/660

(58) Field of Classification Search
None
See application file for complete search history.

(56) References Cited

U.S. PATENT DOCUMENTS

| | | | |
|---|---|---|---|
| 6,212,302 B1 * | 4/2001 | Honsinger et al. | 382/232 |
| 2011/0167333 A1 * | 7/2011 | Sakata | 715/234 |
| 2012/0250956 A1 | 10/2012 | Bocirnea | |

* cited by examiner

*Primary Examiner* — Jwalant Amin
(74) *Attorney, Agent, or Firm* — Alston & Bird LLP

(57) ABSTRACT

An apparatus is provided for adaptively adjusting the rendering quality of one or more images. The apparatus may include at least one memory and at least one processor configured to adjust a rendering quality associated with display of one or more images to degrade the images based in part on a determined distance corresponding to a predetermined threshold. The processor is further configured to cause the apparatus to enable rendering and display of the degraded images in response to receipt of the degraded images from a device or retrieval of the degraded images from a locally stored memory. The degraded images include images having a size that is smaller than a size of corresponding original images. Corresponding computer program products and methods are also provided.

20 Claims, 5 Drawing Sheets

METHODS, APPARATUSES AND COMPUTER PROGRAM PRODUCTS FOR PROVIDING ADAPTIVE RENDERING QUALITY DEGRADATION

TECHNOLOGICAL FIELD

Embodiments of the invention relate generally to a mechanism of rendering one or more images and, more particularly to a method, apparatus and computer program product for adapting the rendering quality of one or more images configured to be displayed.

BACKGROUND

At present, medical imaging often includes creating images of regions of the human body for clinical purposes, such as examination, diagnosis and/or treatment for a patient. The images of a patient study may be accessed and viewed via a dedicated medical image viewer (e.g., a mobile medical image viewer). A medical image viewer may function in conditions characterized by fluctuating network performance and limited hardware performance. These aspects may combine to prevent the medical image viewer from rendering medical images at optimal quality at all times, while maintaining the desired responsiveness to user input.

As an example, in an instance in which a medical image viewer may stream images from a server and display them in quick succession (e.g., scrolling through a set of images), the performance of the medical image viewer may be affected by a number of (compounding) factors.

For instance, the time it takes to transfer the image(s) over the wireless network may affect the performance of the medical image viewer. Additionally, one or more variations in the characteristics of the wireless network of the server, caused by either a poor or inconsistent connection as well as reception network technology such as, for example, utilizing wireless a 3rd generation mobile telecommunications (3G) network as opposed to wireless fidelity (Wi-Fi) may affect the performance of the medical image viewer. Also, the time it takes the medical image viewer to decompress, process and display one or more images may affect the medical image viewer.

As such, one or more of the factors above, may cause a medical image viewer to compromise its rendering quality for a part or an entire duration of an interactive operation such as, for example, a user scrolling through a set of medical images, in order to maintain application responsiveness. In this regard, a medical image viewer may need to degrade its rendering quality in order to enable better performance of the medical image viewer. For instance, a medical image viewer may need to deteriorate (e.g., lower) the quality of (e.g., compress) the medical images being rendered so that the medical image viewer is better able to perform the rendering of the corresponding images. In this regard, for example the medical images may be rendered faster.

At present, mechanisms may exist to address a need for degrading rendering quality, but these existing mechanisms may typically exhibit one or more drawbacks. For instance, these mechanisms may be closely tied to input of a user. In this regard, a degradation technique typically may be applied when a user interacts with a corresponding application (e.g., medical viewer application). For example, degradation algorithm(s) may be applied while the user is dragging a mouse. However, the degradation algorithm(s) may cease being applied when the drag operation ends (e.g., as the user releases the mouse button).

Additionally, current degradation mechanisms may be based on effectively rendering frame rate. In this regard, typically a corresponding algorithm being employed may make decisions regarding whether to apply the degradation and the method of degradation based on the ability of the algorithm to render the desired output with a certain frequency (e.g., frame rate). For example, degradation algorithms may be executed in an instance in which a measured frame rate drops under a minimum acceptable predefined value (e.g., 20 frames per second). However, degrading rendering quality based on a frame rate may be sub-optimal in scenarios where the frequency of states of an application changes significantly over time.

In addition, some existing degradation mechanisms may typically achieve performance improvements by utilizing alternate rendering algorithms. However, utilizing alternative rendering algorithms may require an increased complexity in developing and maintaining such approaches as they may require multiple sets of algorithms to be developed, tested and maintained. Additionally, some existing degradation mechanisms may utilize lower quality source images such as, for example, highly compressed images, with dimensions equal to the dimensions of one or more reference source images. However, a drawback of this approach is that it typically constrains memory bandwidth resources since the highly compressed images are of the same dimensions (e.g., equal size) as the source images. Additionally, such approaches typically exhibit visual compression artifacts.

In view of the foregoing drawbacks, it may be beneficial to provide an efficient and reliable alternative mechanism of applying degradation rendering in order to achieve better performance in rendering one or more images via a display in a computationally efficient and timely manner.

BRIEF SUMMARY

A method, apparatus, and computer program product are therefore provided that enable an efficient and reliable mechanism for adaptively rendering one or more images for display. In this regard, for example, in an instance in which an application associated with displaying images is behind or is lagging by a predetermined threshold, an example embodiment may degrade a rendering quality for display of the images (e.g., medical images). An example embodiment may determine that an application is lagging by a predetermined threshold in response to determining that a computed distance (e.g., a number of states in a queue waiting to be processed) between a desired application state and an actual application state corresponds to a value of the predetermined threshold (e.g., 5). In response to degrading the rendering quality, an example embodiment may request corresponding images from a server that may be smaller or less in size (e.g., reduced size images) than their corresponding original images. The reduced size images may have monotonic decreasing pixel dimensions.

The images may be compressed by the server and sent to a client device of an example embodiment. In response to receipt of the reduced size images, the client device of an example embodiment may render the reduced size images for display. As such, the client device of an example embodiment may render the images faster and more efficiently which may eliminate the lag associated with the corresponding states of an application for rendering the images.

In an instance in which a client device of an example embodiment may determine that the states of the application are no longer lagging, an example embodiment may apply an auto-recovery rendering technique. An example embodiment may determine to apply the auto-recovery technique, in an instance in which a computed distance between a desired application state and an actual application state corresponds to a predetermined threshold. The predefined threshold may relate to a value associated with a distance (e.g., a number of states in a queue waiting to be processed). In one example embodiment, the predefined threshold may be zero. In an alternative exemplary embodiment, the predefined threshold may be any suitable value associated with a distance (e.g., 1, 2, etc.). In an instance in which a client device of an example embodiment invokes the auto-recovery rendering technique, the client device may request one or more images (e.g. a subset of images) of a set of images from a server according to the original size of the images (e.g., full fidelity images). A client device of an example embodiment may render the received images for display as they are received from the server. A client device of an example embodiment may utilize images of decreasing sizes as opposed to images of the same original size with compressions of lower quality. In this regard, the performance of the client device may be enhanced during rendering to conserve resources such as processing capacity and memory bandwidth. For instance, the computation effort to decompress an image decreases with a decrease in image size. In addition, memory bandwidth required to manipulate an image may decrease with a decrease in image size. Also, the computational effort required to process an image decreased in image size may be lower than the computational effort required to process an originally sized image.

In an example embodiment, a method for adaptively adjusting rendering quality of one or more images is provided. The method may include adjusting a rendering quality associated with display of one or more images to degrade the images based in part on a determined distance corresponding to a predetermined threshold. The method may also include enabling rendering and display of the degraded images in response to receipt of the degraded images from a device or retrieval of the degraded images from a locally stored memory. The degraded images including images having a size that is smaller than a size of corresponding original images.

In another example embodiment, an apparatus for adaptively adjusting rendering quality of one or more images is provided. The apparatus may include at least one memory and at least one processor configured to cause the apparatus to adjust a rendering quality associated with display of one or more images to degrade the images based in part on a determined distance corresponding to a predetermined threshold. The processor may further cause the apparatus to enable rendering and display of the degraded images in response to receipt of the degraded images from a device or retrieval of the degraded images from a locally stored memory. The degraded images including images having a size that is smaller than a size of corresponding original images.

In another example embodiment, a computer program product for adaptively adjusting rendering quality of one or more images is provided. The computer program product includes at least one computer-readable storage medium having computer-executable program code instructions stored therein. The computer-executable program code instructions may include program code instructions configured to adjust a rendering quality associated with display of one or more images to degrade the images based in part on a determined distance corresponding to a predetermined threshold. The program code instructions may also be configured to enable rendering and display of the degraded images in response to receipt of the degraded images from a device or retrieval of the degraded images from a locally stored memory. The degraded images including images having a size that is smaller than a size of corresponding original images.

Embodiments of the invention may provide a method, apparatus and computer program product for enabling an efficient, fast and reliable manner in which to render and display images such as, for example, medical images via a client device. As a result, client device users may enjoy an improved experience viewing one or more images via the client device.

DETAILED DESCRIPTION

Figure 1:
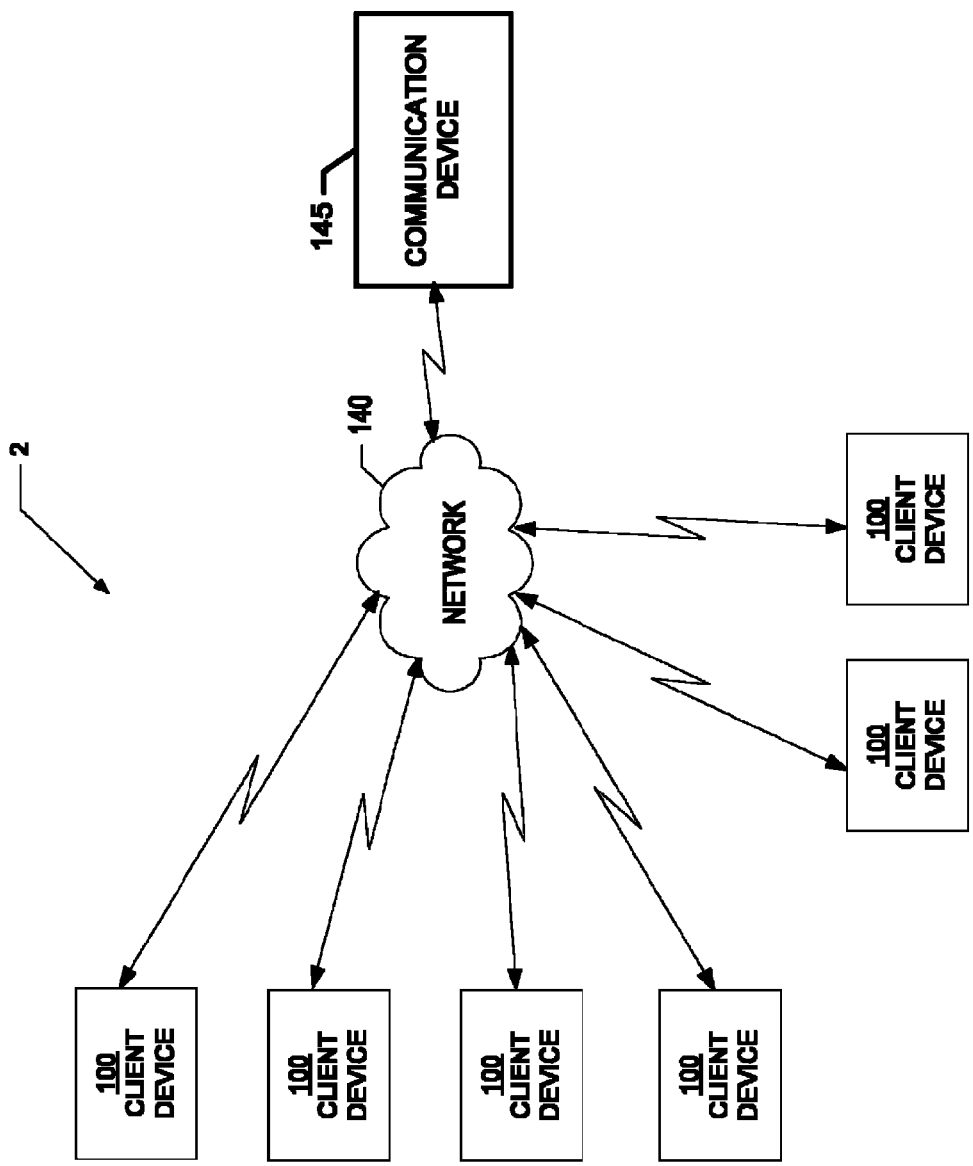
FIG. 1 is a schematic block diagram of a system according to an example embodiment of the invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein an "application state(s)" may refer to a state of one or more areas or regions (e.g., a rectangular sub-region of a user interface) within a user interface (e.g., a display, a touch screen display, etc.) to display one or more renderings of images (e.g. medical images). In this regard, an application state may, but need not, correspond to a set of parameters determining the manner in which an image or a set of images may be rendered. The renderings may, but need not, be created as a result of the user interface receiving commands from either a user, a device or some automated process, either internal or external to the user interface. For example, a user interface may automatically change a displayed frame of a cine clip 30 times per second, without user intervention.

As referred to herein a "command(s)" may, but need not, refer to a result in changes in one or more application parameters dictating the appearance of the renderings, such as, for example, parameters including, but not limited to, indicating what image(s) is to be rendered, as well as the orientation and size of the image(s) relative to an area or region(s) of the user interface in which the rendering is to be displayed. In this regard, a command may be any trigger causing an application to execute a program that alters a set of application parameters.

The application parameters may be changed individually or as a group. Each such change may be the result of a command execution and may result in a meaningful (e.g., coherent) set of parameter values. In this regard, the term "meaningful" (e.g., coherent) may refer to the set of parameters that may be used to create and display useful rendering of one or more images (e.g., medical images).

As referred to herein a "state transition(s)" may refer to a coherent change in an application parameter state, brought over by the application executing a command. As referred to herein, an "application(s)" (e.g., a rendering application) may, but need not, refer to an application of a user interface (e.g., display, touch screen display, etc.) processing states to enable rendering of one or more images associated with the states to be displayed.

As referred to herein a "distance(s)," "computed distance(s)" or other similar terms may refer to a length or a number of one or more stored states or application states. For example, as an application of a user interface processes commands, new states may be created. In this regard, theoretically, a certain state may be processed and the resulting rendering may be displayed as soon as possible after the state becomes available. The application may process these states sequentially. In an ideal scenario, in which an application is able to process and facilitate display of the result of an extant state infinitely fast, the created states may be processed and displayed instantaneously and thus the display may reflect the intent of the most recently created state. However, in the real world, applications are not so infinitely fast as in a theoretical scenario, and thus an application might be in a situation where states may be created faster than the application may process (e.g., the rendering and displaying of the scene specified by the states). In this more realistic scenario, the application may store the states (e.g., a number of states) that have been created but have not yet been processed in a queue. In this regard, the distance(s) or computed distance(s) may be a length or a number of the states in the queue to be processed.

General System Architecture

Reference is now made to FIG. 1, which is a block diagram of a system according to example embodiments. As shown in FIG. 1, the system 2 (e.g., a health care system) may include one or more client devices 100 (e.g., smart devices, tablet computers, mobile telephones, iPad® computers, laptops, personal digital assistants, personal computers, workstations, servers, and the like, etc.) which may access one or more network entities such as, for example, a communication device 145 (e.g., a server), or any other similar network entity, over a network 140, such as a wired local area network (LAN) or a wireless local area network (WLAN), a metropolitan network (MAN) and/or a wide area network (WAN) (e.g., the Internet). In this regard, the communication device 145 is capable of receiving data from and transmitting data to the client devices 100 via network 140.

In one example embodiment, the client devices 100 may be utilized by one or more clinicians, nurses, pharmacists, physicians, physical therapists and/or any other suitable health care professionals or users (e.g., a patient(s)).

The communication device 145 may communicate with the client devices 100. In this regard, the communication device 145 may receive a request for one or more medical image(s) (e.g., a Digital Imaging and Communications in Medicine (DICOM) medical image(s)) from one or more of the client devices 100. In response to receipt of the request, the communication device 145 may send the requesting client device 100 one or more corresponding images (e.g., a set of medical images). The image(s) (e.g., medical images) may be received dynamically from the communication device 145, or the images that have been previously generated and stored in a memory of the client device 100, may be rendered by the requesting client device 100. In an example embodiment, in an instance in which the client device 100 may determine that a computed distance between a desired application state and an actual application state is equal to or below a predetermined threshold, the client device may degrade a rendering quality. In this regard, images being received from the communication device 145 by the client device 100 may be degraded, which may enhance the performance of the client device 100, as described more fully below.

It should be pointed out that although FIG. 1 shows six client devices 100 and one communication device 145 any suitable number of client devices 100 and communication devices 145 may be part of the system of FIG. 1 without departing from the spirit and scope of the invention.

Communication Device

Figure 2:
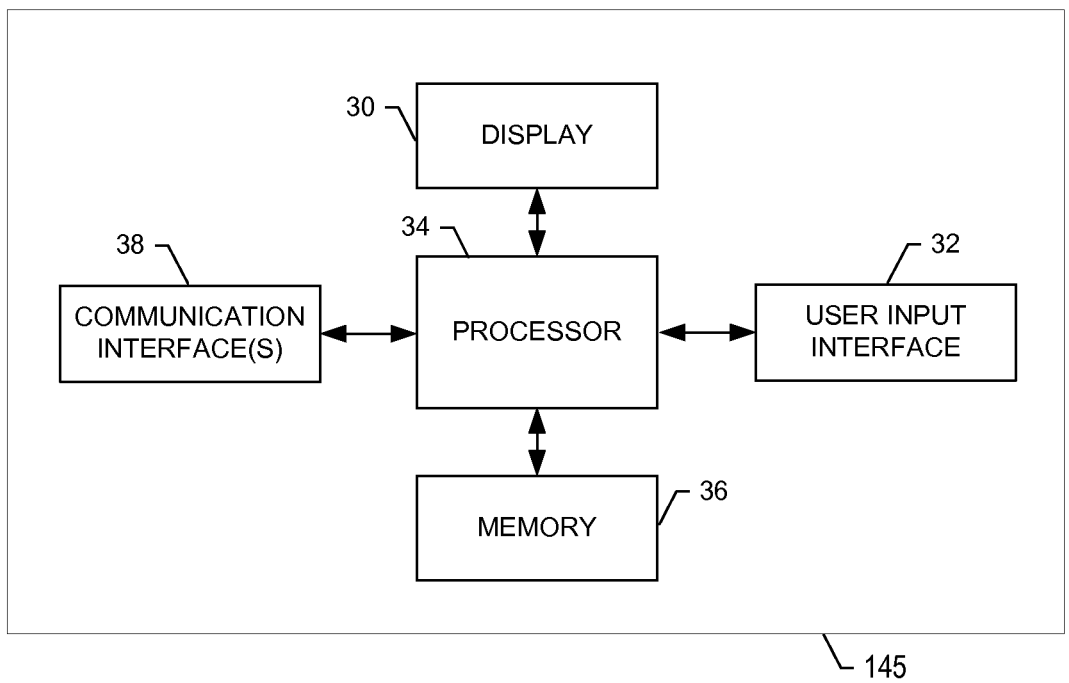
FIG. 2 is a schematic block diagram of a communication device according to an example embodiment of the invention.

FIG. 2 illustrates a block diagram of a communication device according to an example embodiment of the invention. The communication device 145 may, but need not, be a network entity such as, for example, a server. The communication device 145 includes various means for performing one or more functions in accordance with example embodiments of the invention, including those more particularly shown and described herein For example, as shown in FIG. 2, the communication device 145 may include a processor 34 connected to a memory 36. The memory may comprise volatile and/or non-volatile memory, and typically stores content (e.g., media content, medical images, etc.), data, information or the like.

For example, the memory may store content transmitted from, and/or received by, the communication devices 145. In this regard, in an example embodiment, the memory 36 may store one or medical images (e.g., DICOM medical images, X-rays of the human body, etc.) and any other suitable information. Some of the medical images may be part of a set of medical images. For instance, a set of the medical images may, but need not, relate to images of a patient study (e.g., a computed tomography (CT) scan of a body part(s) of a patient), or any other set or group of medical images.

Also for example, the memory 36 typically stores client applications, instructions, algorithms or the like for execution by the processor 34 to perform steps associated with operation of the communication device 145 in accordance with embodiments of the invention. As explained below, for example, the memory 36 may store one or more client applications such as for example software (e.g., software code also referred to herein as computer code).

The processor 34 may be embodied as a controller, coprocessor, microprocessor of other processing devices including integrated circuits such as, for example, an application specific integrated circuit (ASIC), a field programmable gate array (FPGA). In an example embodiment, the processor may execute instructions stored in the memory 36 or otherwise accessible to the processor 34. The processor 34 may also be connected to at least one communication interface 38 or other means for transmitting and/or receiving data, content or the like.

The communication device 145 may also include at least one user interface that may include one or more earphones and/or speakers, a display 30, and/or a user input interface 32.

The user input interface 32, in turn, may comprise any of a number of devices allowing the entity to receive data from a user, such as a microphone, a keypad, keyboard, a touch display, a joystick, image capture device, pointing device (e.g., mouse), stylus or other input device.

In an example embodiment, the processor 34 may receive a request for one or more images (e.g., medical images) stored in the memory 36 from a client device 100. In response to receipt of the request, the processor 34 may dynamically send the client device 100 the requested images. The client device 100 may render the received images, or one or more images previously received from the communication device 145 that may be stored in its memory 86, for display of the images. In an example embodiment, the processor 34 of the communication device 145 may reduce a size of images that may be sent to a client device 100, in response to receipt of an indication from the client device 100 that the client device 100 is degrading rendering quality, as described more fully below. In this regard, the client device 100 may render the requested images of reduced sizes for display, which may enhance the performance of the client device 100, as described more fully below. For instance, the client device may render the requested reduced size images faster than it may render the corresponding images in their original size which may result in computation or processing efficiency.

Client Device

Figure 3:
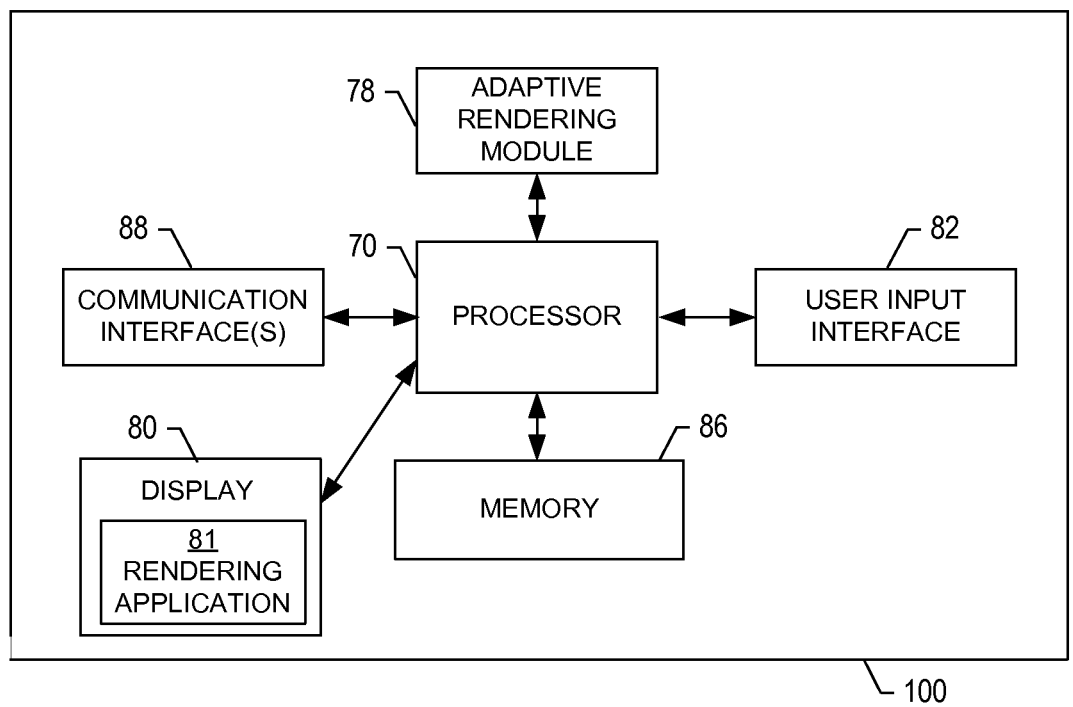
FIG. 3 is a schematic block diagram of a client device according to an example embodiment of the invention.

FIG. 3 illustrates a block diagram of a client device according to an example embodiment of the invention. While the client device 100 may include or be embodied in one or more fixed electronic devices, such as one or more of a desktop computer, workstation computer, server computer or the like, the client device may comprise, include or be embodied in one or more portable electronic devices, such as one or more of a mobile telephone, portable digital assistant (PDA), tablet computer, laptop computer, iPad® computer or the like. As such, the client device need not be a dedicated device, that is, a device dedicated to the processing and display of medical images, but may be a general purpose computing device in some example embodiments.

The client device 100 includes various means for performing one or more functions in accordance with example embodiments of the invention, including those more particularly shown and described herein. It should be understood, however, that one or more of the client devices may include alternative means for performing one or more like functions, without departing from the spirit and scope of the invention. More particularly, for example, as shown in FIG. 3, the client device 100 may include a processor 70 connected to a memory 86. The memory may comprise volatile and/or non-volatile memory, and typically stores content (e.g., media content, medical information, etc.), data, information or the like.

For example, the memory may store content transmitted from the communication device 145 or other client devices 100. In this regard, the memory is capable of storing data including, but not limited to, medical data such as medical images or X-rays of the human body or one or more parts of the human body, as well as any other suitable medical information. The medical images described herein may be generated with the use of non-ionizing radiation, electromagnetic energy emitted by X-rays, ultrasound technology, magnetic resonance imaging or any other suitable mechanism or modality to view anatomical parts of the human body or animals. The medical images described herein may be formatted in accordance with the DICOM protocol which is a standard for storing handling, printing, receiving and transmitting information in medical imaging. Additionally, the communication device 145 may utilize JPEG-XR as the format for transmitting the medical images to the client device 100.

Also for example, the memory 86 typically stores client applications, instructions, algorithms or the like for execution by the processor 70 to perform steps associated with operation of the client device 100 in accordance with embodiments of the invention. As explained below, for example, the memory 86 may store one or more client applications such as, for example, software (e.g., software code also referred to herein as computer code).

The processor 70 may be embodied in a variety of ways. For instance, the processor 70 may be embodied as a controller, coprocessor, microprocessor of other processing devices including integrated circuits such as, for example, an application specific integrated circuit (ASIC), a field programmable gate array (FPGA). In an example embodiment, the processor may execute instructions stored in the memory 86 or otherwise accessible to the processor 70.

The client device 100 may include one or more logic elements for performing various functions of one or more client applications. In an example embodiment, the client device 100 may execute the client applications. The logic elements performing the functions of one or more client applications may be embodied in an integrated circuit assembly including one or more integrated circuits (e.g., an ASIC, FPGA or the like) integral or otherwise in communication with a respective network entity (e.g., computing system, client, server, etc.) or more particularly, for example, a processor 70 of the respective network entity.

In addition to the memory 86, the processor 70 may also be connected to at least one interface or other means for displaying, transmitting and/or receiving data, content or the like. The interface(s) can include at least one communication interface 88 or other means for transmitting and/or receiving data, content or the like. In this regard, the communication interface 88 may include, for example, an antenna and supporting hardware and/or software for enabling communications with a wireless communication network. For example, the communication interface(s) may include a first communication interface for connecting to a first network, and a second communication interface for connecting to a second network. In this regard, the client device is capable of communicating with other devices such as, for example, the communication device 145 or other client devices over one or more networks (e.g., network 140) such as a Local Area Network (LAN), wireless LAN (WLAN), Wide Area Network (WAN), Wireless Wide Area Network (WWAN), the Internet, or the like. Alternatively, the communication interface can support a wired connection with the respective network.

In addition to the communication interface(s), the interface (s) may also include at least one user interface that may include one or more earphones and/or speakers, a display 80 (e.g., a touch screen display), and/or a user input interface 82. The display 80 may, but need not, be a user interface associated with one or more applications 81 (also referred to herein as rendering application 81) (e.g., software code) processing one or more states to enable rendering of one or more images (e.g., medical images), video data or the like, associated with the states, to be displayed. The applications (e.g., rendering application 81) associated with the display 80 may by executed by the processor 70 and/or the adaptive rendering module 78. The user input interface, in turn, may comprise any of a number of devices allowing the entity to receive data from a user, such as a microphone, a keypad, keyboard, a touch display, a joystick, image capture device, pointing device (e.g., mouse), stylus or other input device.

In an example embodiment, the processor 70 may be in communication with and may otherwise control an adaptive rendering module 78. The adaptive rendering module 78 may be any means such as a device or circuitry operating in accordance with software or otherwise embodied in hardware or a combination of hardware and software thereby configuring the device or circuitry (e.g., a processor, controller, microprocessor or the like) to perform the corresponding functions of the adaptive rendering module 78, as described below. In examples in which software is employed, a device or circuitry (e.g., processor 70 in one example) executing the software forms the structure associated with such means. As such, for example, the adaptive rendering module 78 may be configured to, among other things, degrade a rendering quality in response to determining that a computed distance between a desired application state and an actual application state corresponds to a predetermined threshold (e.g., a value of 5). A determination that the computed distance corresponds to the predetermined threshold may indicate or denote to the adaptive rendering module 78 that the applications states associated with the rendering of images (e.g., medical images) for display may be lagging. As such, the images shown via a display (e.g., display 80) during the lag may appear to lack detail.

In an instance in which the adaptive rendering module 78 may determine that the computed distance corresponds to the predetermined threshold, the adaptive rendering module 78 may degrade a rendering quality and may request one or more images of a set of the images from the communication device 145 (e.g., a server) having sizes smaller than the sizes of the corresponding original images. In this regard, the images of the smaller or reduced sizes may have monotonically decreasing pixel dimensions generated by the communication device 145, as described more fully below.

Upon receipt of the reduced size images, the client device 100 may render these images for display. Since the images have a reduced size, the adaptive rendering module 78 may render the reduced size images in a fast and efficient manner, which may eliminate the lag associated with the application states. In this manner, the adaptive rendering module 78 may conserve processing, memory and other resources of the client device 100, as described more fully below.

In an instance in which the adaptive rendering module 78 may subsequently determine that the computed distance is, for example, zero, the adaptive rendering module 78 may invoke an auto-recovery technique. In an instance in which the adaptive rendering module 78 may determine that the computed distance is zero, the adaptive rendering module 78 may determine that a desired application state equals an actual application state. In other words, the distance between the desired application state and the actual application state is zero. In this regard, the adaptive rendering module 78 may request full-fidelity images (e.g., medical images) from the communication device 145. The full-fidelity images may, in part, correspond to images in their original size.

Example System Operation

Example embodiments of the invention may provide an efficient and reliable mechanism for adaptively rendering one or more images for display. In this regard, for example, in an instance in which an application associated with displaying images is behind or is lagging by a predetermined threshold, a client device of an example embodiment may degrade a rendering quality for display of images (e.g., medical images). A client device of an example embodiment may determine that an application is lagging by a predetermined threshold in response to determining that computed distance (e.g., number of states in a queue awaiting to be processed) between a desired application state and the actual application state corresponds to a value of the predetermined threshold (e.g., 5). In response to degrading the rendering quality, a client device of an example embodiment may request corresponding images from a server (e.g., communication device 145) that may be smaller or less in size (e.g., reduced size images) than their corresponding original images. As such, the images may be compressed by the server and sent to a client device of an example embodiment. Upon receipt of the reduced size images, a client device of an example embodiment may render the reduced size images for display. This may enable the client device of an example embodiment to render the images faster and more efficiently which may eliminate the lag associated with the application states.

In an instance in which a client device of an example embodiment may determine that the application states are no longer lagging, a client device of an example embodiment may apply an auto-recovery technique. A client device of an example embodiment may determine to apply the auto-recovery technique, in an instance in which a computed distance between a desired application state and an actual application state corresponds to a predetermined threshold. The predefined threshold may relate to a value associated with a distance (e.g., a number of states in a queue waiting to be processed). In one example embodiment, the predefined threshold may be zero. In an alternative example embodiment, the predefined threshold may be any suitable value associated with a distance (e.g., 1, 2, etc.). In an instance in which a client device of an example embodiment may invoke the auto-recovery technique the client device of the example embodiment may request one or more images of a set of images from a server (e.g., communication device 145) according to the original size of the images (e.g., full fidelity images). A client device of an example embodiment may render the received images for display as they are received from the server.

As an example of the manner in which an example embodiment may adaptively adjust the quality for rendering one or more images for display, consider an instance in which a user of a client device may utilize the display 80 (e.g., a touch screen display) to scroll very rapidly through a sequence of images. In this regard, scrolling through the sequence of images very rapidly may cause or trigger the adaptive rendering module 78 and/or the processor 70 to detect a frequency of state changes associated with an application (e.g., rendering application 81) of the display 80 for rendering images, videos or the like to be very high (e.g., 60 times per second). The application (e.g., rendering application 81) of the display may be executed by the adaptive rendering module 78 and/or the processor 70 to enable rendering of images, video data or the like for display (e.g., via display 80). In this regard, the adaptive rendering module 78 may determine, for example, that the distance (e.g., number of states in a queue waiting to be processed) between a desired application state and the actual application state is, for example, 5, which may be equal to a predetermined threshold (e.g., 5). As such, the adaptive rendering module 78 may degrade the quality for rendering images via the display 80. In this regard, the rendering module 78 may send a request to the communication device 145 for corresponding images (e.g., medical images (e.g., a set of images of a human body part)) that are reduced in size. The request may include data specifying reduced size images and may, but need not, include data indicating that the adaptive rendering module 78 is degrading the quality of rendering.

In response to receipt of the request, the communication device 145 may reduce the sizes of the corresponding original images, in the manner described more fully below, and may send the reduced size images to the adaptive rendering module 78 of the client device 100. Prior to sending the reduced size images to the adaptive rendering module 78, the processor 34 of the communication device 145 may compress the reduced size images. Upon receipt, the adaptive rendering module 78 may render the reduced size images for display via display 80. In this manner, the adaptive rendering module 78 may render the reduced size images faster than it may render the corresponding original sized images and as such, the adaptive rendering module 78 may eliminate the lag associated with the states (e.g., application states). For instance, in this example, the adaptive rendering module 78 may begin degrading rendering quality only after approximately 0.08 seconds of total lag (e.g., corresponding to 5 state transitions). As such, the distance between the desired application state and the actual application state may be zero, which may equal a predefined threshold for invoking an auto-recovery technique. As such, a number of states stored in a queue to be processed may be zero. The queue may be stored in a memory (e.g., memory 86) of the client device 100.

It should be pointed out that in an example embodiment, the adaptive rendering module 78 may not necessarily invoke the auto-recovery technique immediately as the number of states in the queue reaches the predetermined threshold (e.g., 5). Instead, the adaptive rendering module 78 may delay the auto-recovery technique for a preset amount of time (e.g., predefined time interval) and may apply the auto-recovery technique in an instance in which a length of the queue is still below the predetermined threshold (e.g., 5) at the end or expiration of the predefined time interval. In an example embodiment, the predefined time interval may be 0.25 seconds. However, in an alternative example embodiment, the predetermined time interval may be any other suitable period of time (e.g., 0.33 seconds). In this manner, the adaptive rendering module 78 may prevent a fluctuating effect in which the rendering mechanisms may continuously adjust the rendering quality around a value at which equilibrium may be reached.

Since the adaptive rendering module 78 may determine that the distance between the desired application state and the actual application state may correspond to a predefined threshold (e.g., zero), the adaptive rendering module 78 may invoke or implement an auto recovery technique. In this regard, adaptive rendering module 78 may send a message or request to the communication device 145 for one or more corresponding images according to their original size (e.g., full fidelity images). The data in the request may, but need not, indicate that the adaptive rendering module 78 is utilizing auto recovery. In response to receipt of the request, the communication device 145 may send the corresponding images in their original size to the adaptive rendering module 78 of the client device 100. In an example embodiment, prior to sending the images to the adaptive rendering module 78, the processor 34 of the communication device 145 may compress the images. Upon receipt of the images (e.g., full fidelity images) the adaptive rendering module 78 may render the received images for display via display 80. Thereafter, the adaptive rendering module 78 may render images, video data or the like according to a full fidelity rendering technique in which images may be rendered according to their original image size. The full fidelity rendering technique may be implemented by the adaptive rendering module 78 until the adaptive rendering module 78 may determine that the distance between the desired application state and the actual application state reaches or exceeds a predetermined threshold (e.g., is 5 or greater).

For instance, as another example, consider an instance in which a user may tap (e.g., with a finger, pointing device or the like) various thumbnails images on a touch screen display (e.g., display 80) in order to switch an image to be rendered for display. In this example, the adaptive rendering module 78 may determine that each state transition may take, for example, 1 second. As such, the adaptive rendering module 78 may not degrade the rendering quality in an instance in which the adaptive rendering module 78 may determine that the distance between the desired application state and the actual application state is less than a predetermined threshold (e.g., 5). In this example, the adaptive rendering module 78 may determine that the distance (e.g., 3) between the desired application state and the actual application state is less than the predetermined threshold. As such, the adaptive rendering module 78 may implement full fidelity rendering for images according to the original size of the images.

In this manner, the adaptive rendering module 78 may automatically adjust to match the desired frequency of state changes as determined by the adaptive rendering module 78. It should be pointed out that the quality degradation rendering may be invoked, by the adaptive rendering module 78, sooner in instances in which the desired frequency of state changes may be high and later in instances in which the frequency of state changes may be low. This approach may enable rendering at full-fidelity for as long as possible without introducing the perception of lag associated with an application (e.g., rendering application 81).

Figure 4:
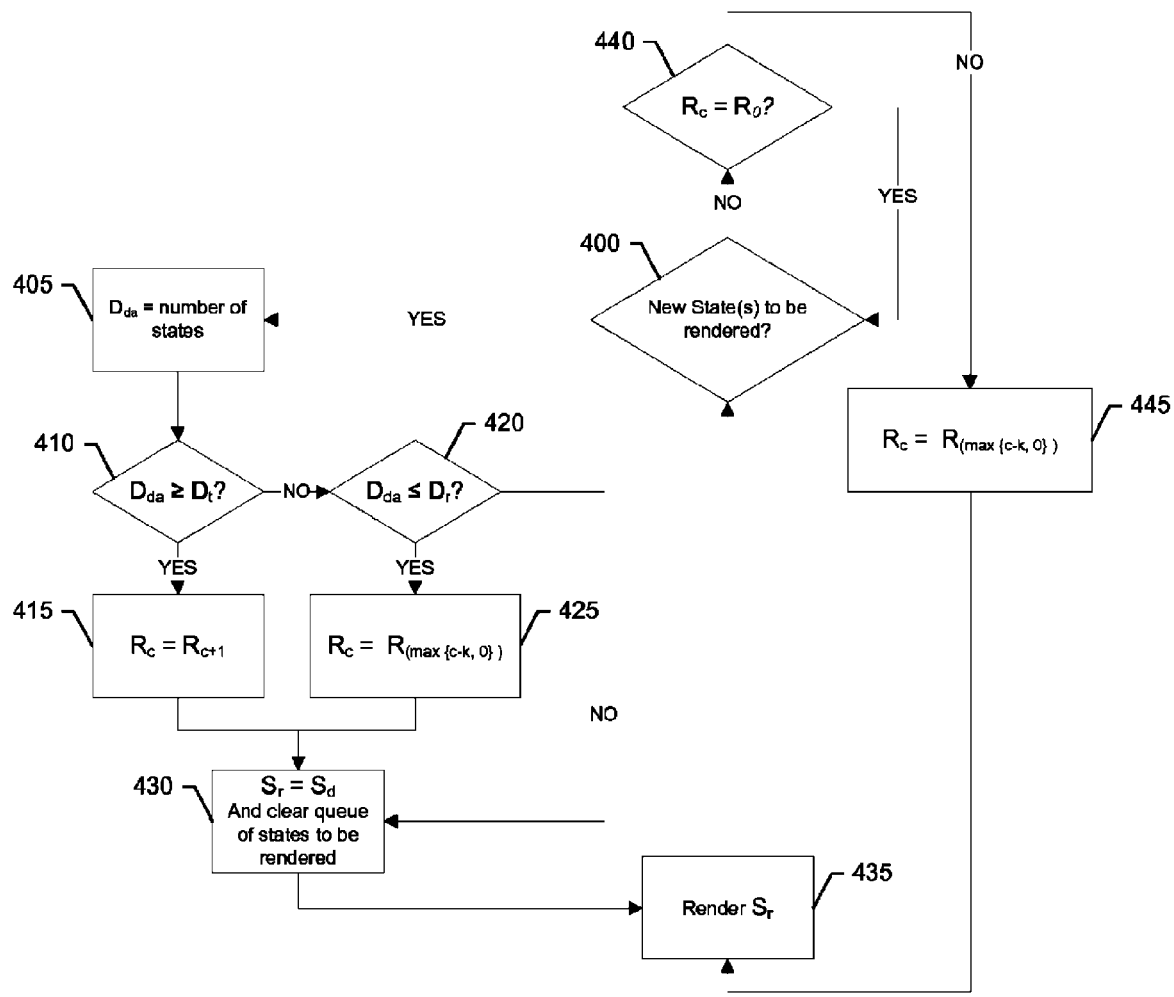
FIG. 4 is a flowchart for determining whether to adjust rendering quality of one or more images according to an example embodiment of the invention.

Referring now to FIG. 4, an example method for determining whether to adaptively adjust rendering quality according to an example embodiment is provided. In an example embodiment, the adaptive rendering module 78 may determine whether to implement a decision algorithm. With respect to the decision algorithm, the adaptive rendering module 78 may determine whether to apply degradation quality rendering based in part on a computed distance (e.g., $D_t$ (e.g., $D_t=5$)) between a desired application state and an actual application state. According to an example embodiment, this distance may be computed or determined by the adaptive rendering module 78 and/or the processor 70 utilizing the following algorithm.

Let $S_1, S_2 \ldots S_n$ define the set of states the application (e.g., rendering application 81) is to render at times $t_1, t_2 \ldots t_n$. These states may be the result of user interaction or other triggers, such as automation (e.g., playing a movie may automatically require displaying a new frame every 0.33 seconds). The states may relate to a number of states in a queue stored in a memory waiting to be performed for rendering of corresponding images, video data or the like.

Given time $t_d$, the time at which the distance measurement may be performed, $S_d$, the desired state of the application at time $t_m$ and $S_a$, the actual state of the application, the distance $D_{da}$ may be computed or determined, by the adaptive rendering module 78, as $D_{da}=d-a$.

It should be pointed out that the mechanism for computing the distance $D_a$ used by the adaptive rendering module 78 may not need to consider the time interval between the desired application state ($S_d$) and the actual application state ($S_a$). Instead, only the number of requested rendering states between the two may be analyzed by the adaptive rendering module 78. In an alternative example embodiment, the currently employed algorithm may consider the time interval between the desired application state ($S_d$) and the actual application state ($S_a$) in addition to or instead of the currently used measurement relating to the number of requested rendering states.

Given $R_0, R_1, R_2 \ldots R_n$, the set of available rendering methods (where $R_0$ represents full-fidelity rendering and $R_1 \ldots R_n$ increasingly rendering methods of decreasing quality) and $R_c$, the rendering method currently used by the application (e.g., rendering application 81), the adaptive rendering module 78 may determine every time the application may be requested to render a new state. (See block 400 of FIG. 4) For every instance in which the application may be requested to render a new state(s), the adaptive rendering module 78 may compute the Distance $D_{da}$. (See block 405 of FIG. 4). The adaptive rendering module 78 may switch the rendering method from $R_c$ to $R_{c+1}$ in an instance in which $D_{da} \geq D_t$, where $D_t$ may be a predetermined threshold. (See blocks 410 & 415 of FIG. 4) In an example embodiment $D_t$ may be 5. However, in an alternative example embodiment, $D_t$ may be any other suitable number or value (e.g., 7, 8, etc.). In this regard, when the adaptive rendering module 78 determines that $D_{da} \geq D_t$ (See block 410) and switches $R_c$ to $R_{c+1}$ (See block 415), the adaptive rendering module 78 may degrade the rendering quality. In this regard, in an instance in which the adaptive rendering module 78 determines that $D_{da}=0$ (e.g., where $D_r=0$), the adaptive rendering module 78 may clear the states waiting to be to be rendered in a queue by rendering the corresponding state to be rendered ($S_r$). (See blocks 430 & 435 of FIG. 4) Thereafter, the adaptive rendering module 78 may determine whether a new state(s) is to be rendered. (See block 400 of FIG. 4)

The adaptive rendering module 78 may switch the rendering method from $R_c$ to $R_{(max\ \{c-k,\ 0\})}$ if $D_{da} \leq D_r$, where $D_r < D_t$ may be a predefined threshold and k may be a positive natural integer. (See blocks 415 & 420 of FIG. 4) In an example embodiment, the predefined threshold for $D_r$ may be zero (e.g., $D_r=0$) and k may equal 1 (e.g., k=1). In an alternative example embodiment, the predefined threshold for $D_r$ may be any other suitable number or value (e.g., 1, 2). It should be pointed out that in an instance in which the adaptive rendering module 78 may determine that $D_{da} \leq D_r$, and the adaptive rendering module 78 switches the rendering method from $R_c$ to $R_{(max\ \{c-k,\ 0\})}$, the adaptive rendering module may apply auto-recovery rendering in the manner described above. In other words, $R_{(max\ \{c-k,\ 0\})}$ denotes the auto-recovery rendering method of an example embodiment. As described above, the adaptive rendering module 78 may invoke the auto-recovery rendering method after a predefined delay or time interval (e.g., 0.25 seconds).

The auto-recovery algorithm may be implemented by the adaptive rendering module 78 based on the following. Given $R_0, R_1, R_2 \ldots R_n$, the set of available rendering methods (where $R_0$ represents full-fidelity rendering and $R_1 \ldots R_n$ rendering methods of decreasing quality) and $R_c$, the rendering method currently used by an application, where $0 \leq c \leq n$, a new rendering method to be employed may be $R_q$, where q=max(c-k, 0), and where max(x,y) may denote the function computing the maximum of the two input values x and y. As described above, k may be a positive natural number.

In this regard, the parameters of $R_q$ may be defined such that the auto-recovery algorithm being implemented by the adaptive rendering module 78 may select a new rendering method to be used as one of a higher quality, skipping k-1 intermediate methods and the adaptive rendering module 78 may not select a rendering method better than the full-fidelity rendering method $R_0$.

In an instance in which the adaptive rendering module 78 switches $R_c$ to $R_{(max\ \{c-k,\ 0\})}$ (See block 425 of FIG. 4) invoking auto-recovery, the adaptive rendering module 78 may clear the states, if any, waiting to be to be rendered in a queue by rendering the corresponding state to be rendered ($S_r$). In this regard, the state to be rendered may be the desired application state ($S_d$), which when executed by the adaptive rendering module 78 may effectively clear the queue. (See blocks 430 & 435 of FIG. 4) Thereafter, the adaptive rendering module 78 may determine whether a new state(s) is to be rendered. (See block 400 of FIG. 4)

In an instance in which the adaptive rendering module 78 may determine that $R_c$ equals $R_o$, denoting that the current rendering method equals a full fidelity rendering, the adaptive rendering module 78 may determine whether there is a new state(s) to be rendered. (See blocks 440 & 400 of FIG. 4) On the other hand, in an instance in which the adaptive rendering module 78 may determine that $R_c$ does not equal $R_o$, denoting that the current rendering method does not equal a full fidelity rendering, the adaptive rendering module 78 may switch the current rendering method to $R_c$ to $R_{(max\ \{c-k,\ 0\})}$ to invoke auto-recovery. (See blocks 440 and 445 of FIG. 4) The adaptive rendering module 78 may then render a state to be rendered ($S_r$) and may determine whether a new state(s) needs to be rendered. (See blocks 435 and 400 of FIG. 4)

It should be pointed out that predefined thresholds or values for $D_t$, $D_r$ and k may be chosen in a heuristic manner and may be adjusted according to the needs of a system. Additionally, these values may be adjusted based on user preferences regarding the tradeoff between application responsiveness and rendering quality. In addition, these values may be automatically adjusted, by the adaptive rendering module 78 during application (e.g., rendering application 81) execution by additional application algorithms based on a particular application usage scenario as well as any other suitable factors. For example, an application may switch from a Wi-Fi connection to a 3G connection while in use. In this regard, the adaptive rendering module 78 may adjust the parameters, for example, to tolerate a larger lag on the 3G connection, in order to retain acceptable rendering quality. In an instance in which one or more of the values relating to $D_t$, $D_r$ and k are changed for any reason, the changed values may be remembered, by the adaptive rendering module 78, across application sessions and may subsequently be reused. In this regard, the adaptive rendering module 78 may store the changed values in a memory (e.g., memory 86) and may reuse the changed values across application sessions.

As described above, in an instance in which the adaptive rendering module 78 may perform degradation quality rendering, the adaptive rendering module 78 may request one or more images having sizes smaller (e.g., reduced size images) than their corresponding original images. Also, as described above the communication device 145 may generate the reduced size images and may send the reduced size images to the adaptive rendering module 78 of a client device 100.

In response to receipt of a request or a message requesting one or more images having a reduced size for rendering from the adaptive rendering module 78, the processor 34 of the communication device 145 may include X number of pixels in a row and Y number of pixels in a column. Additionally, the set of related images created by the processor 34 of the communication device may be designated by $\{I_1 \ldots I_n\}$, where all images in the set may depict the same information or at least a portion of the same information. The processor 34 of the communication device 145 may create a normalized image, designated $I_0$ with same pixel dimensions as an original image (X, Y). In this regard, $\{I_1 \ldots I_n\}$ may have monotonic decreasing pixel dimensions. The monotonic decreasing pixel dimensions of the images of the set $\{I_1 \ldots I_n\}$ may relate to images that have a size that is smaller than a size of their corresponding original images. For instance, in an instance in which $D_n$ represents the dimensions of Image $I_n$, the set of images may be defined as $\{I_1 \ldots I_n; D_n=\{X/(2_n), Y/(2_n)\}$ and $(X/2_n \geq 2_k \text{ or } Y/2_n \geq 2_k)\}$. In this representation, k may represent the maximum dimension of the smallest image in the series. Since the maximum dimension of the smallest image in the series is $2_k$, the maximum dimensions of the smallest image may be set to any of a wide variety of sizes, but in one embodiment, k=7 such that the maximum dimension of the smallest image in the series is no smaller than 128 (or $2_7$). The maximum dimensions of the smallest image are generally driven by the requirements of the client devices to which the images will be served. In response to generated in the images with the monotonic decreasing pixel dimensions, the processor 34 of the communication device 145 may send these images to the adaptive rendering module 78 for rendering to enable display of the images.

For more information regarding a manner in which one or more images (e.g., medical images) may be reduced in size by a network entity such as, for example, a server and sent to a device, such as, for example, a client device for rendering the received images, see U.S. patent application Ser. No. 13/075, 495, entitled: Method, Apparatus And Computer Program Product For Normalizing And Processing Medical Images, filed concurrently herewith. The contents of the foregoing patent application are hereby incorporated by reference in its entirety.

In an example embodiment of the invention, given $R_0, R_1, R_2 \ldots R_n$, that is, the available rendering methods, the adaptive rendering module 78 may implement a client-side algorithm which may be utilized to process and display the images that may remain unchanged across $R_0, R_1, R_2 \ldots R_n$. In this regard, images being rendered may use the same image processing method across each of the rendering methods of an example embodiment. As such, the size of the rendered images may change, but not necessarily the manner in which the adaptive rendering module 78 renders the images. More precisely, the adaptive rendering module 78 may not need to implement algorithms that are computationally cheaper in instances in which the rendering methods may change. However, in an alterative example embodiment, the adaptive rendering module 78 may implement one or more client-side algorithms that may provide image processing, rendering and display and that may vary across a set of given rendering methods, such as, for example, $R_0, R_1, R_2 \ldots R_n$.

As described above, the rendering quality degradation performed by the adaptive rendering module 78 of an example embodiment may be achieved by the adaptive rendering module 78 requesting and processing smaller versions of one or more images to be rendered. In this regard, given $R_c$, the rendering method in currently in use, the adaptive rendering module 78 may request from a server (e.g., communication device 100), process and display a corresponding image $I_c$, the current image to be rendered in an image set $\{I_1 \ldots, I_n\}$. This approach may concomitantly address two distinct sources of performance degradation. For instance, image transfer times and client device image processing performance. With respect to image transfer times, given identical network conditions, an example embodiment may enable smaller images to be transferred in a shorter time. Regarding client device image processing performance, the computational effort required to decompress an image, for example, may decrease with image size. Additionally, the memory bandwidth required to manipulate an image(s) may decrease with image size. Also, the computational effort required to process (e.g., apply a per-pixel algorithm to a corresponding image(s)) may decrease with image size.

By requesting corresponding smaller size images during quality rendering degradation, the rendered images of an example embodiment may result in better perceived image quality since displaying smaller images, resulting in degraded quality may avoid the visual artifacts apparent in methods employing highly compressed images having the same size as the original image(s).

Figure 5:
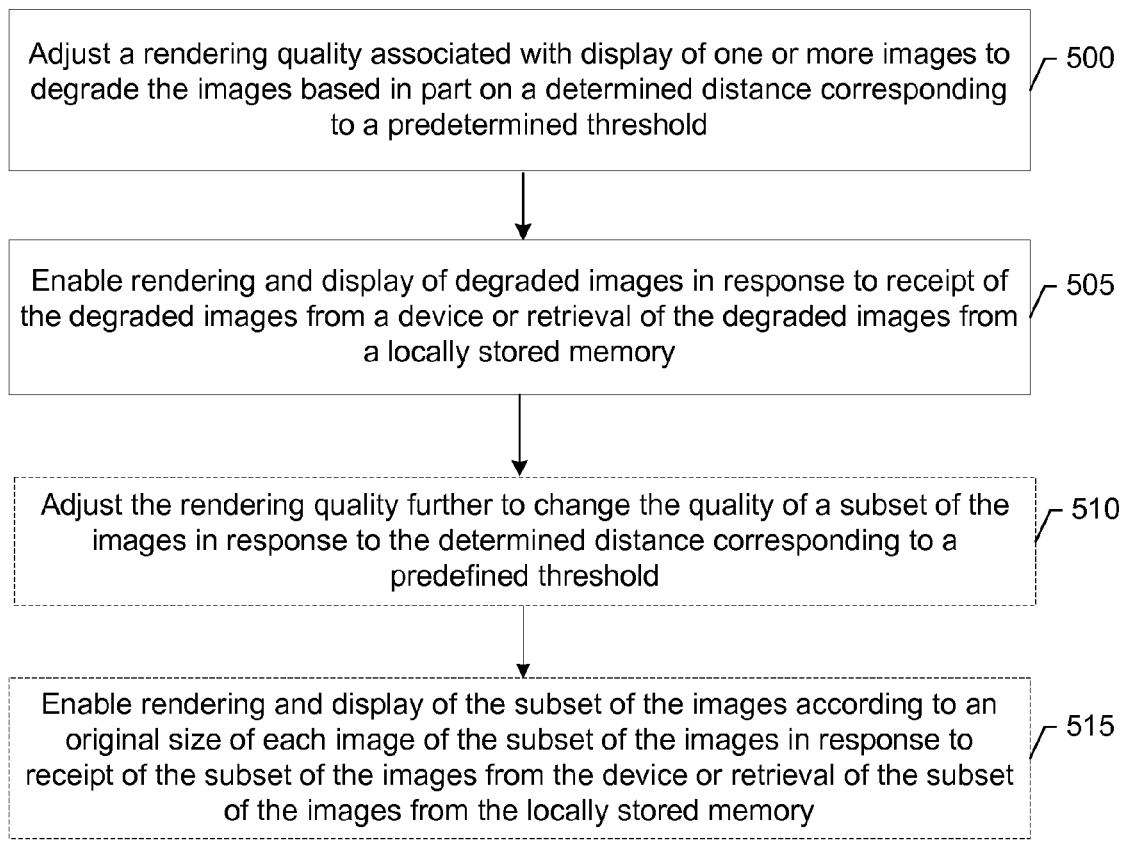
FIG. 5 is a flowchart for applying rendering quality degradation according to an example embodiment.

Referring now to FIG. 5, an example method for adaptively adjusting rendering quality of one or more images according to an example embodiment is provided. At operation, 500, an apparatus (e.g., adaptive rendering module 78) may adjust a rendering quality associated with display of one or more images to degrade the images based in part on a determined distance corresponding to a predetermined threshold (e.g., $D_t$=5). At operation 505, an apparatus (e.g., adaptive rendering module 78) may enable rendering and display of degraded images in response to receipt of the degraded images from a device (e.g., communication device 145) or retrieval of the degraded images from a locally stored memory (e.g., memory 86). The degraded images may include images having a size that is smaller than a size of corresponding original images.

Optionally, at operation 510, the apparatus (e.g., adaptive rendering module) may adjust the rendering quality further (e.g., invoke an auto-recovery rendering technique) to change the quality of a subset of the images in response to the determined distance corresponding to a predefined threshold (e.g., $D_r$=0). Optionally, at operation 515, the apparatus (e.g., adaptive rendering module 78) may enable rendering and display of the subset of the images according to an original size of each image of the subset of the images in response to receipt of the subset of the images from the device (e.g., communication device 145) or retrieval of the subset of the images from the locally stored memory (e.g., memory 86).

It should be pointed out that FIGS. 4 & 5 are flowcharts of a system, method and computer program product according to exemplary embodiments of the invention. It will be understood that each block or step of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 86, memory 36) and executed by a processor (e.g., processor 70, processor 34, adaptive rendering module 78). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowcharts blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts blocks or steps.

Accordingly, blocks or steps of the flowcharts support combinations of means for performing the specified functions and combinations of steps for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In an exemplary embodiment, an apparatus for performing the methods of FIGS. 4 & 5 above may comprise a processor (e.g., the processor 70, the processor 34, the adaptive rendering module 78) configured to perform some or each of the operations described above. The processor may, for example, be configured to perform the operations by performing hardware implemented logical functions, executing stored instructions, or executing algorithms for performing each of the operations. Alternatively, the apparatus may comprise means for performing each of the operations described above. In this regard, according to an example embodiment, examples of means for performing operations may comprise, for example, the processor 34, the processor 70 (e.g., as means for performing any of the operations described above), the adaptive rendering module 78 and/or a device or circuit for executing instructions or executing an algorithm for processing information as described above.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
adjusting, via a processor, a rendering quality associated with display of one or more images to degrade the images based in part on a determined distance corresponding to a predetermined threshold; and
enabling rendering and display of the degraded images in response to receipt of the degraded images from a device or retrieval of the degraded images from a locally stored memory, the degraded images comprising images having a size that is smaller than a size of corresponding original images, the determined distance denotes that one or more states of a rendering application are lagging.

2. The method of claim 1, wherein receipt of the degraded images from the device are in response to the device receiving a message indicating that the rendering quality is being adjusted to lower the quality of the images.

3. The method of claim 1, further comprising:
calculating the determined distance.

4. The method of claim 3, wherein the determined distance equals a number of states of an application between a desired application state and an actual application state.

5. The method of claim 1, wherein:
the images comprise one or more medical images.

6. The method of claim 1, further comprising:
adjusting the rendering quality further to change the quality of a subset of the images in response to the determined distance corresponding to a second predetermined threshold.

7. The method of claim 6, wherein:
the determined distance equals a number of states of an application between a desired application state and an actual application state, and wherein the second predetermined threshold is zero.

8. The method of claim 6, further comprising:
enabling rendering and display of the subset of the images according to an original size of each image among the subset of the images in response to receipt of the subset of the images from the device or retrieval of the subset of the images from the locally stored memory.

9. The method of claim 8, wherein the receipt of the images in their original size from the device is responsive to a message sent to the device indicating that one or more states of a rendering application are no longer lagging.

10. An apparatus comprising:
at least one processor; and
at least one memory including computer program code, the at least one memory and the computer program code configured to, with the processor, cause the apparatus to:
adjust a rendering quality associated with display of one or more images to degrade the images based in part on a determined distance corresponding to a predetermined threshold; and
enable rendering and display of the degraded images in response to receipt of the degraded images from a device or retrieval of the degraded images from a locally stored memory, the degraded images comprising images having a size that is smaller than a size of corresponding original images, the determined distance denotes that one or more states of a rendering application are lagging.

11. The apparatus of claim 10, wherein receipt of the degraded images from the device are in response to the device receiving a message indicating that the rendering quality is being adjusted to lower the quality of the images.

12. The apparatus of claim 10, wherein the memory and the computer program code are further configured to, with the processor, cause the apparatus to:
calculate the determined distance.

13. The apparatus of claim 12, wherein the determined distance equals a number of states of an application between a desired application state and an actual application state.

14. The apparatus of claim 10, wherein:
the images comprise one or more medical images.

15. The apparatus of claim 10, wherein the memory and the computer program code are further configured to, with the processor, cause the apparatus to:
adjust the rendering quality further to change the quality of a subset of the images in response to the determined distance corresponding to a second predetermined threshold.

16. The apparatus of claim 15, wherein:
the determined distance equals a number of states of an application between a desired application state an actual application state, and wherein the second predetermined threshold is zero.

17. The apparatus of claim 15, wherein the memory and the computer program code are further configured to, with the processor, cause the apparatus to:

enable rendering and display of the subset of the images according to an original size of each image among the subset of the images in response to receipt of the subset of the images from the device or retrieval of the subset of the images from the locally stored memory.

18. The apparatus of claim 17, wherein the receipt of the images in their original size from the device is responsive to a message sent to the device indicating that one or more states of a rendering application are no longer lagging.

19. A computer program product comprising at least one non-transitory computer-readable storage medium having computer-executable program code instructions stored therein, the computer executable program code instructions comprising:

program code instructions configured to adjust a rendering quality associated with display of one or more images to degrade the images based in part on a determined distance corresponding to a predetermined threshold; and program code instructions configured to enable rendering and display of the degraded images in response to receipt of the degraded images from a device or retrieval of the degraded images from a locally stored memory, the degraded images comprising images having a size that is smaller than a size of corresponding original images, the determined distance denotes that one or more states of a rendering application are lagging.

20. The computer program product of claim 19, further comprising:

program code instructions configured to calculate the determined distance.

* * * * *